(12) United States Patent
Takahashi

(10) Patent No.: US 7,579,747 B2
(45) Date of Patent: Aug. 25, 2009

(54) ELECTROSTATIC ACTUATOR

(75) Inventor: Isao Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/121,651

(22) Filed: May 15, 2008

(65) Prior Publication Data

US 2008/0224565 A1 Sep. 18, 2008

Related U.S. Application Data

(63) Continuation of application No. PCT/JP2006/322806, filed on Nov. 16, 2006.

(30) Foreign Application Priority Data

Nov. 18, 2005 (JP) ............................. 2005-334581

(51) Int. Cl.
*H01N 1/00* (2006.01)
(52) U.S. Cl. ........................ 310/309; 318/116
(58) Field of Classification Search ................ 310/309; 318/116; 360/294.2
See application file for complete search history.

(56) References Cited

U.S. PATENT DOCUMENTS

| | | | |
|---|---|---|---|
| 5,055,731 A | | 10/1991 | Nihei et al. |
| 6,308,573 B1 * | | 10/2001 | Lee et al. ................. 73/652 |
| 6,424,504 B1 * | | 7/2002 | Abe et al. .............. 360/294.4 |
| 6,657,359 B1 * | | 12/2003 | Hoen et al. ............... 310/309 |
| 6,713,939 B2 * | | 3/2004 | Kasahara ................. 310/309 |
| 6,781,279 B2 * | | 8/2004 | Lee et al. ................. 310/309 |
| 2007/0024155 A1 * | | 2/2007 | Calvet et al. ............. 310/309 |

FOREIGN PATENT DOCUMENTS

| | | |
|---|---|---|
| EP | 0 411 176 A1 | 2/1991 |
| JP | 3-65084 A | 3/1991 |
| JP | 7-184377 | 7/1995 |
| JP | 2001-346385 | 12/2001 |
| JP | 2005-333755 | 12/2005 |

OTHER PUBLICATIONS

International Search Report dated Jan. 23, 2007 from International Application No. PCT/JP2006/322806.

* cited by examiner

*Primary Examiner*—Burton Mullins
(74) *Attorney, Agent, or Firm*—Beyer Law Group LLP

(57) ABSTRACT

An electrostatic actuator includes a stator having a plurality of protruding electrodes formed on a surface of a base material, where the surface serves as a counter surface, and a mover disposed so as to face the stator, where the mover has a plurality of protruding electrodes formed on a surface of a base material and the surface serves as a counter surface. A side surface of each of the protruding electrodes of the stator faces a side surface of a corresponding one of the protruding electrodes of the mover. Planar electrodes are formed on at least one of the counter surface of the stator and the counter surface of the mover in a portion other than a portion where the protruding electrodes are formed, and the planar electrodes face end surfaces of the protruding electrodes formed on the other counter surface.

10 Claims, 7 Drawing Sheets

ELECTROSTATIC ACTUATOR

CLAIM OF PRIORITY

This is a continuation of International Application No. PCT/JP2006/322806, filed Nov. 16, 2006, which is incorporated herein by reference in its entirety.

BACKGROUND OF INVENTION

1. Field of the Invention

The present invention relates to an electrostatic actuator that operates using an electrostatic force and, in particular, to an electrostatic actuator useful for reducing the size of a device and increasing the driving power of the device, or decreasing the driving voltage.

2. Description of the Related Art

Existing electrostatic actuators include a stator having three-phase belt-shaped electrodes formed on an insulating support member 1 at a 400 μm pitch, a mover disposed on the stator and formed by applying a resistive layer onto a thin insulating leaf member, and a driving voltage control unit including a DC high voltage power supply, a high voltage switching unit 11, and a drive control unit 2. The mover is driven by switchingly applying a driving voltage from the driving voltage control unit to the belt-shaped electrodes (refer to, for example, Patent Document 1).

[Patent Document 1] Japanese Unexamined Patent Application Publication No. 7-184377

[Patent Document 2] Japanese Unexamined Patent Application Publication No. 2001-346385

SUMMARY OF THE INVENTION

In order to use such an electrostatic actuator for, for example, conveying means for moving an autofocus lens in a camera, a driving force sufficient for moving the lens is required. In addition, at that time, the moving speed needs to be increased, and the response time needs to be decreased. To achieve this goal, an electrostatic actuator that can provide a large driving force by generating a large electrostatic force (a Coulomb force) is needed.

In general, the electrostatic force is proportional to a square of the applied voltage and the facing area between electrodes, and is inversely proportional to a gap size between the electrodes. Accordingly, by setting these factors to optimum values, a larger electrostatic force can be obtained.

However, to increase the applied voltage, problems of the power of a battery which can be mounted in a camera and the breakdown voltage arise. In addition, to decrease the gap size, a problem of machining accuracy arises.

Furthermore, the above-described existing electrostatic actuators have a structure in which the belt-shaped electrodes formed on the stator planarly face the resistive layer of the mover, and the driving voltage is applied to the belt-shaped electrodes. Accordingly, in order to increase the facing area between the electrodes, the area of each of the electrodes formed on the stator needs to be increased. As a result, the body of the electrostatic actuator becomes larger, and fine control of the operation becomes difficult.

The present inventor invented an electrostatic actuator including a mover and a stator facing each other and having a plurality of protruding electrodes formed thereon. An application related to this invention has been filed as Japanese Patent Application No. 2004-151180. Note that this is not included in the prior art references since this had not been published at the time when an application of the present invention was filed.

In Japanese Patent Application No. 2004-151180, protruding electrodes are disposed so that the side surfaces of the protruding electrodes face each other in the width direction that is perpendicular to the moving direction of the mover. By disposing a plurality of such electrodes, the facing area that contributes to an electrostatic force can be significantly increased in the height direction.

However, in Japanese Patent Application No. 2004-151180, although the protruding electrode has six surfaces, only two side surfaces among the six surfaces are used. Thus, it is inefficient for generating a driving force.

Accordingly, the present invention addresses the problems described above by providing an electrostatic actuator that has a compact size and a high driving power. When the same driving force is obtained, the driving voltage for the electrostatic actuator can be decreased.

The present invention provides an electrostatic actuator including a stator having a plurality of protruding electrodes formed on a surface of a base material, where the surface serves as a counter surface, and a mover disposed so as to face the stator, where the mover has a plurality of protruding electrodes formed on a surface of a base material, and the surface serves as a counter surface. A side surface of each of the protruding electrodes of the stator faces a side surface of a corresponding one of the protruding electrodes of the mover. Planar electrodes are formed on at least one of the counter surface of the stator and the counter surface of the mover in a portion other than a portion where the protruding electrodes are formed, and the planar electrodes face end surfaces of the protruding electrodes formed on the other of the counter surface of the stator and the counter surface of the mover.

In the electrostatic actuator according to the present invention, the facing area between the electrodes of the stator and the mover can be increased. Accordingly, a Coulomb force acting on one of the electrodes or a phase electrode can be increased, and therefore, the mover can be moved with a large driving force.

A plurality of belt-shaped electrodes can be formed on at least one of the counter surfaces. Each of the plurality of belt-shaped electrodes extends in a width direction perpendicular to a moving direction in which the mover is moved, and the plurality of belt-shaped electrodes are arranged along the moving direction. The protruding electrodes can be formed so as to protrude from the surfaces of the belt-shaped electrodes.

In the above-described means, a driving signal can be applied to the plurality of protruding electrodes and belt-shaped electrodes via the belt-shaped electrodes.

In addition, the plurality of belt-shaped electrodes formed on one of the counter surfaces can be connected to each other.

In the above-described means, the electric potentials of all of the protruding electrodes and belt-shaped electrodes can be the same. Accordingly, for example, these electrodes can be used for ground electrodes.

In addition, it is desirable that each of the plurality of belt-shaped electrodes forms a phase electrode to which a driving signal is applied from a power feeding unit.

In the above-described means, different driving signals can be applied to the individual belt-shaped electrodes. Accordingly, by controlling the timing of application of each of the driving signals, the mover can be moved.

Furthermore, at least one of the stator and the mover can include a plurality of through-holes passing through the base material. A conductive portion can be disposed in each of the through-holes, and a conductor pattern can be formed on the lower surface of the base material. One end of the conductive portion can be electrically connected to the protruding electrodes and the planar electrodes, and the other end of the conductive portion can be electrically connected to the conductor pattern.

In the above-described means, driving signals can also be applied to the plurality of protruding electrodes and belt-shaped electrodes.

A conductor plate can be provided on the other counter surface, and the planar electrodes and the protruding electrodes can be formed on the conductor plate.

In the above-described means, the electric potentials of the planar electrodes and the protruding electrodes can be made the same using a pre-installed conductor plate.

In the above-described means, it is desirable that the electrostatic actuator includes planar electrodes formed by raising the surface of the conductor plate into a protruding shape and protruding electrodes formed by growing a layer on the surface of the planar electrodes by plating.

In the above-described means, since the planar electrodes can be formed by a press process, the fabrication process can be simplified and speeded up. In addition, since the protruding electrodes can be formed on a surface of the planar electrode pre-formed on the conductor plate, the protruding electrodes can be formed more accurately.

It is desirable that a plurality of protruding electrodes arranged in the moving direction at predetermined intervals and a plurality of planar electrodes arranged in the moving direction at predetermined intervals are disposed so as to be disposed alternately in the width direction.

In the above-described means, a variation in an electrostatic force applied to the mover in the width direction can be reduced. That is, the difference between the electrostatic forces occurring on an X1 side and an X2 side of the stator can be reduced and made substantially uniform. Accordingly, the mover can be smoothly moved in the moving direction.

In an electrostatic actuator according to the present invention, the facing area between the electrodes of the stator and the mover can be increased, and therefore, an electrostatic force occurring between the electrodes can be increased.

Alternatively, the driving voltage can be decreased or the size of the body of a device can be reduced.

BRIEF DESCRIPTION OF THE DRAWINGS

FIG. 4A is a side view illustrates a face-to-face relationship between the protruding mover electrode and a planar stator electrode, and FIG. 4B is a side view illustrates a face-to-face relationship between the planar mover electrode and the protruding stator electrode.

DESCRIPTION OF THE PREFERRED EMBODIMENTS

Figure 1:
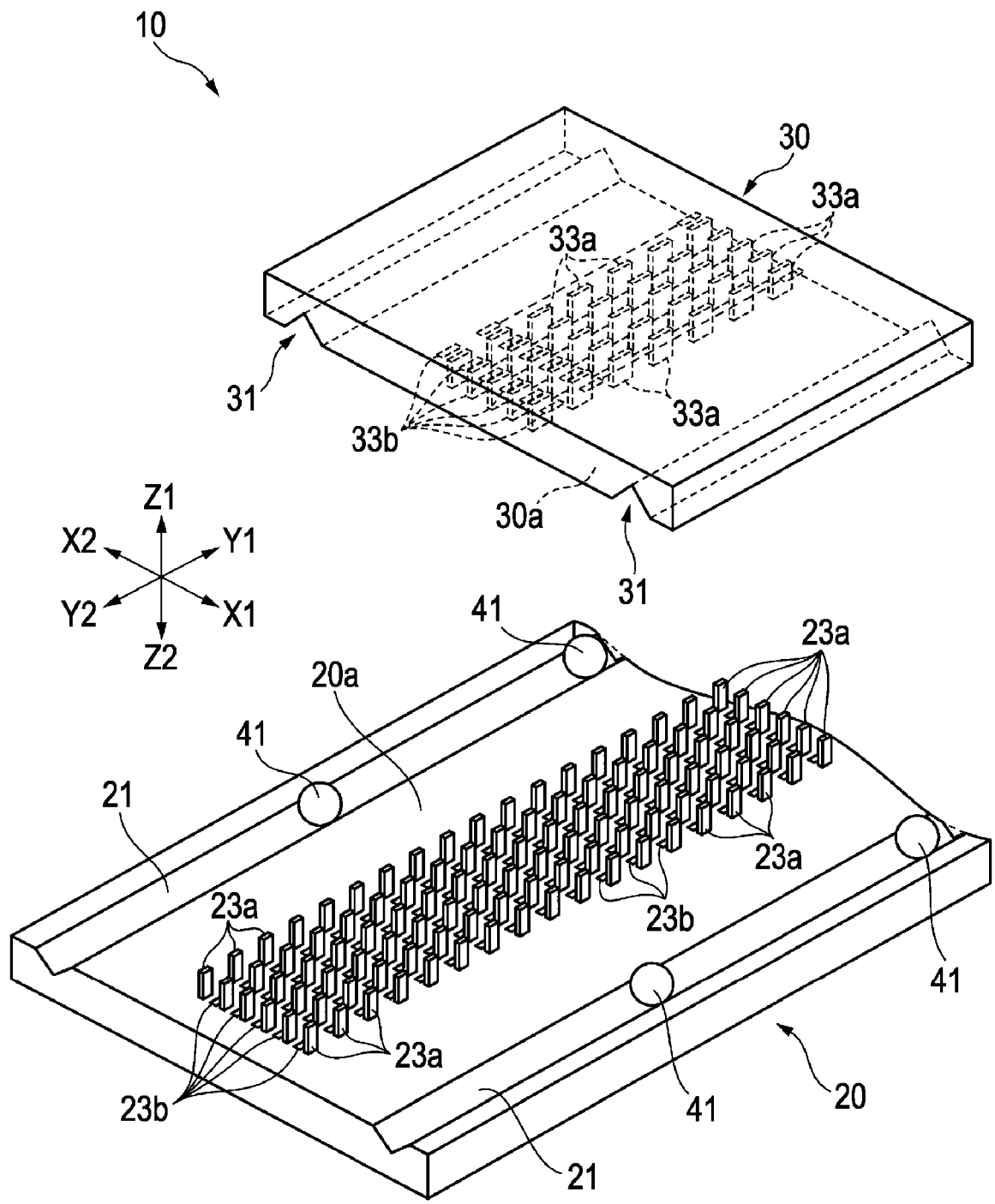
FIG. 1 is a perspective view of an electrostatic actuator according to the present invention.
Figure 2:
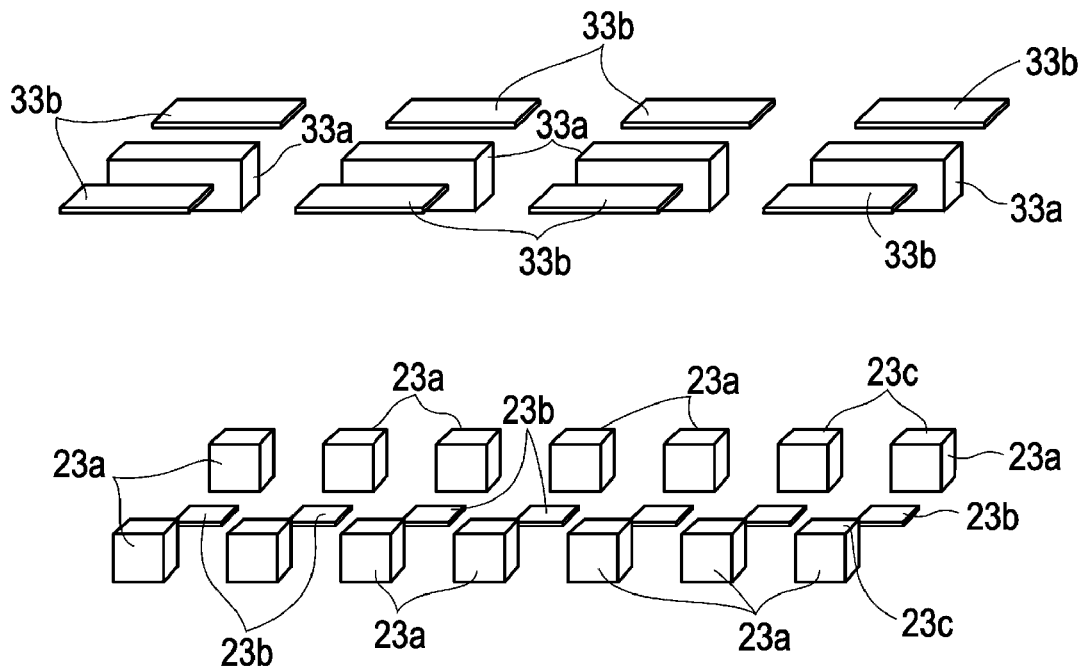
FIG. 2 is a partial perspective view illustrating the arrangement of electrodes of an electrostatic actuator according to a first embodiment of the present invention.
Figure 3:
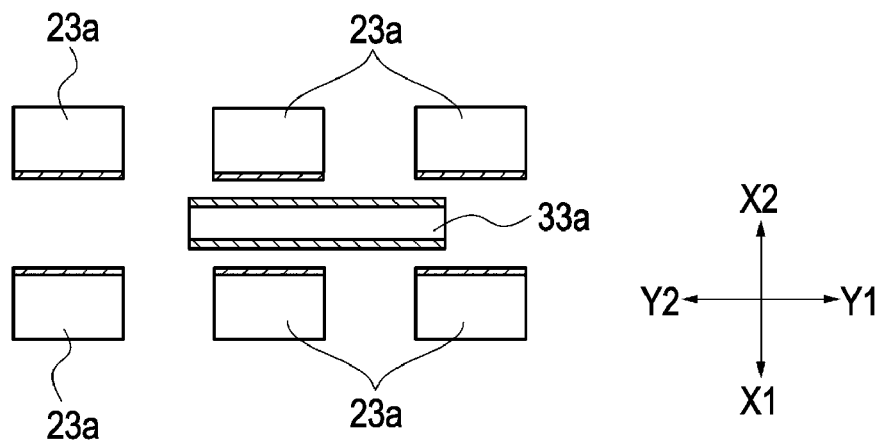
FIG. 3 is a partial plan view illustrating a positional relationship between a protruding mover electrode and a protruding stator electrode.
Figure 4:
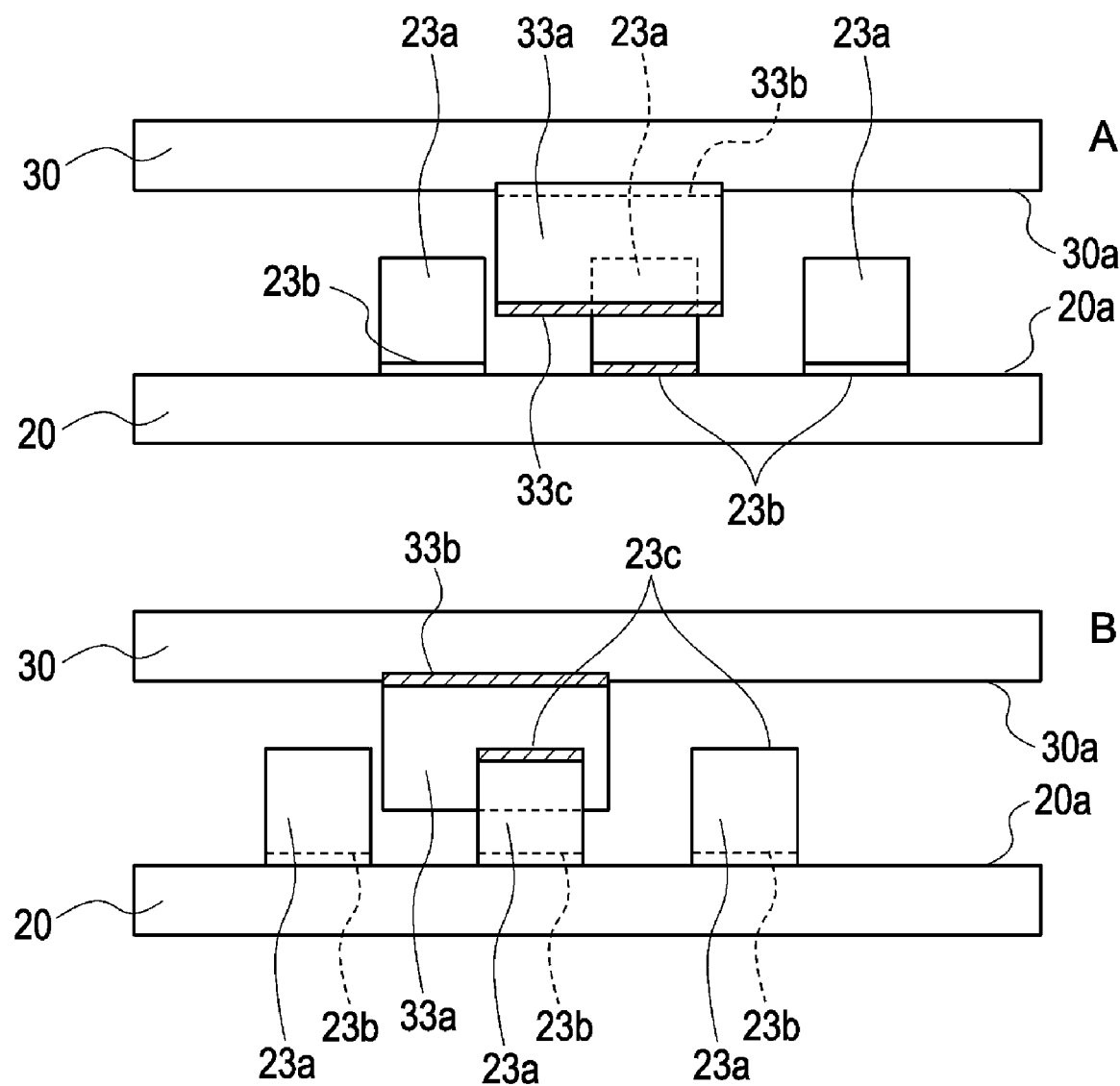
FIG. 4 illustrates side views of a stator and a mover viewed from a gap therebetween, where

FIG. 1 is a perspective view of an electrostatic actuator according to the present invention. FIG. 2 is a partial perspective view illustrating an arrangement of electrodes of an electrostatic actuator according to a first embodiment of the present invention. FIG. 3 is a partial plan view illustrating a positional relationship between a protruding mover electrode and a protruding stator electrode. FIG. 4 illustrates side views of a stator and a mover viewed from a gap therebetween, where FIG. 4A is a side view illustrating a face-to-face relationship between the protruding mover electrode and a planar stator electrode, and FIG. 4B is a side view illustrating a face-to-face relationship between the planar mover electrode and the protruding stator electrode. In FIGS. 2 and 3, the mover and the stator are not shown. Only the electrodes are illustrated.

According to the present invention, as shown in FIG. 1, an electrostatic actuator 10 includes a stator 20 disposed on a Z2 side in the height direction and a mover 30 disposed on a Z1 side in the height direction.

The stator 20 is a plate-like member extending in the Y direction, which is a moving direction. For example, the stator 20 is formed from a silicon base material. Two guide grooves 21 and 21 are formed in two end portions of a counter surface 20a (a surface on the Z1 side) of the stator 20 in the width direction (the X direction) so as to extend parallel to each other in the moving direction (the Y direction). Each of the guide grooves 21 has a V-shaped cross section. The surfaces of the guide grooves 21 and 21 are smooth surfaces having small friction resistance.

The length of the mover 30 in the moving direction (the Y direction) is smaller than that of the stator 20. Two support grooves 31 and 31 are formed in two end portions of a counter surface 30a (a surface on the Z2 side) of the mover 30 in the width direction (the X direction) so as to face the guide grooves 21 and 21, respectively. Like the guide grooves 21 and 21, each of the support grooves 31 and 31 has a V-shaped cross section. The surfaces of the support grooves 31 and 31 are smooth surfaces having small friction resistance.

As shown in FIG. 1, the stator 20 is assembled with the mover 30 with the counter surface 20a facing the counter surface 30a. At that time, a plurality of balls 41 and 41 are disposed between one of the guide grooves 21 and 21 and the corresponding one of the support grooves 31 and 31. That is, the mover 30 is supported by the guide grooves 21 and 21 of the stator 20 with the plurality of balls 41 and 41.

For example, each of the balls 41 and 41 is formed from a hard-plastic material. The mover 30 is supported so that a predetermined sized gap is formed between the counter surface 20a and the counter surface 30a in the height direction at all times.

At that time, if a force is exerted to the mover 30 in the moving direction, the plurality of balls 41 and 41 roll between one of the guide grooves 21 and 21 and the corresponding one of the support grooves 31 and 31 in the moving direction. Accordingly, the mover 30 can be linearly moved in the moving direction. That is, according to the present embodiment, the guide grooves 21 and 21, the support grooves 31 and 31, and the plurality of balls 41 and 41 function as guiding means for guiding the mover 30 in the moving direction.

As shown in FIGS. 1 and 2, a plurality of protruding stator electrodes 23a and a plurality of planar stator electrodes 23b are formed on the counter surface 20a of the stator 20. In an arrangement of the protruding stator electrodes 23a, electrodes are arranged in a line along the moving (Y) direction so as to form a comb shape. A plurality of the lines are arranged in the width (X) direction that is perpendicular to the moving direction. As a result, the protruding stator electrodes 23a are regularly arranged in a matrix (in a lattice). In addition, each of the protruding stator electrodes 23a has a shape of a cube or a rectangular parallelepiped and has an end surface 23c that faces the counter surface 30a of the mover 30. Each of the plurality of planar stator electrodes 23b has a plate-like shape. The planar stator electrodes 23b are disposed between pairs of neighboring protruding stator electrodes 23a in the width direction.

In a similar manner, a plurality of protruding mover electrodes 33a and a plurality of planar mover electrodes 33b are formed on the counter surface 30a of the mover 30.

In an arrangement of the protruding mover electrodes 33a, electrodes are arranged in a line along the moving (Y) direction so as to form a comb shape. A plurality of the lines are arranged in the width (X) direction that is perpendicular to the moving direction. As a result, the protruding mover electrodes 33a are regularly arranged in a pattern close to a matrix. In addition, each of the protruding mover electrodes 33a has a shape of a cube or a rectangular parallelepiped and has an end surface 33c that faces one of the planar stator electrodes 23b formed on the counter surface 20a of the stator 20. Each of the plurality of planar mover electrodes 33b has a plate-like shape. The planar mover electrodes 33b are disposed between pairs of neighboring protruding stator electrodes 23a in the width direction.

When the stator 20 and the mover 30 are formed from a silicon base material, the planar stator electrodes 23b and the planar mover electrodes 33b are formed by forming an insulating film (e.g., an oxidized film) on the base material and pattern-forming planar conductive portions (e.g., chrome or copper portions) on the insulating film. Subsequently, the protruding stator electrode 23a and the protruding mover electrode 33a are formed as follows. The surfaces of the conductive portions to be formed into the planar stator electrodes 23b or the planar mover electrodes 33b are covered by a resist layer, and the other conductive portions are exposed. Thereafter, conductive metal layers (e.g., copper layers) are grown on the exposed surfaces of the conductive portions by plating vertically in the Z direction.

In an example shown in FIG. 2, the protruding stator electrodes 23a and the planar stator electrodes 23b are formed on the counter surface 20a at an equal pitch along the moving (Y) direction. Similarly, the protruding mover electrodes 33a and the planar mover electrodes 33b are formed on the counter surface 30a so as to have the same length and are arranged at an equal pitch along the moving (Y) direction.

Note that the mover 30 may include the protruding mover electrode 33a and the planar mover electrodes 33b having different length. In addition, the pitch may be unequal. However, it is desirable that the neighboring protruding mover electrode 33a and planar mover electrode 33b in the width direction have the same length and the same pitch.

The stator 20 includes a plurality of through-holes extending in the thickness direction of the stator 20, conductive portions disposed in the through-holes, and a plurality of conductor patterns wired on the lower surface (the surface on the Z2 side) of the stator 20 (neither are shown). One end of each of the conductive portions disposed in the through-holes is electrically connected to any one of the protruding stator electrodes 23a or any one of the planar stator electrodes 23b disposed on the counter surface 20a. The other end is electrically connected to any one of the electrode patterns disposed on the lower surface.

A plurality of pairs of neighboring protruding stator electrode 23a and planar stator electrode 23b disposed on the front surface of the stator 20 are electrically connected to each other via the conductor patterns and the conductive portions disposed in the through-holes. These electrodes form a phase electrode having the same potential. Such phase electrodes are arranged in a plurality of lines in the moving direction.

The neighboring phase electrodes in the moving direction are electrically insulated. The phase electrodes arranged in the moving direction serve as, for example, an A-phase electrode, a B-phase electrode, a C-phase electrode, a D-phase electrode, and an E-phase electrode repeatedly in this order on a line-to-line basis. Note that the same driving signal is applied to the phase electrodes of the same type.

Similarly, the mover 30 includes a plurality of through-holes extending in the thickness direction of the mover 30, conductive portions disposed in the through-holes, and a plurality of conductor patterns wired on the lower surface (the surface on the Z1 side) of the mover 30 (none are shown). The plurality of protruding stator electrodes 33a and the plurality of the planar stator electrodes 33b disposed on the mover 30 are electrically connected to each other via the conductor patterns and the conductive portions disposed in the through-holes and have the same potential.

An external power feeding unit (not shown) is connected between the five types of phase electrodes of the stator 20 and the conductor patterns of the mover 30. A predetermined driving signal is supplied from the power feeding unit to each of the electrodes. In the following description, the stator 20 serves as a plus pole of the driving signal and the mover 30 serves as a minus pole of the driving signal.

As shown in FIG. 3, after the stator 20 and the mover 30 are assembled, one of the side surfaces of one of the protruding mover electrodes 33a in the X direction faces a side surface (on the X2 side) of one of the protruding stator electrodes 23a located on the X1 side of the protruding mover electrode 33a. The other side surface of the protruding mover electrode 33a faces a side surface (on the X1 side) of one of the protruding stator electrodes 23a located on the X2 side of the protruding mover electrode 33a. When a difference in potential between the protruding stator electrode 23a and the protruding mover electrode 33a occurs, an electrostatic force is generated between the portions that face each other.

In addition, as shown in FIG. 4A, the end surface 33c of one of the protruding mover electrodes 33a faces one of the planar stator electrodes 23b in the height direction. Furthermore, as shown in FIG. 4B, the end surface 23c of one of the protruding stator electrodes 23a faces one of the planar mover electrodes 33b in the height direction. When a difference in potential between the planar mover electrode 33b and the protruding stator electrode 23a occurs, an electrostatic force is generated between the portions that face each other. In FIGS. 3, 4A, and 4B, the surfaces of the electrodes that generate electrostatic forces for moving the mover in the Y direction are shown by hatching.

That is, according to the present embodiment, the protruding mover electrodes 33a and the planar mover electrodes 33b are alternately arranged on the counter surface 30a of the mover 30 in the width direction. An electrostatic force can be primarily applied to the two side surfaces and the end surface of each of the protruding mover electrodes 33a. In addition, an electrostatic force can be generated for the planar mover electrodes 33b. As described above, according to the present embodiment, the facing area between electrodes can be increased, as compared with that of the existing electrostatic actuator. Therefore, the mover 30 can be pulled with a large driving force. Alternatively, even when the driving voltage is lowered or the number of the electrodes is reduced, the driving force having the same power as the existing electrostatic actuator can be obtained. Therefore, the voltage of the power feeding unit can be lowered, or the size of the electrostatic actuator can be reduced. The operation of the electrostatic actuator is described next.

Figure 5:
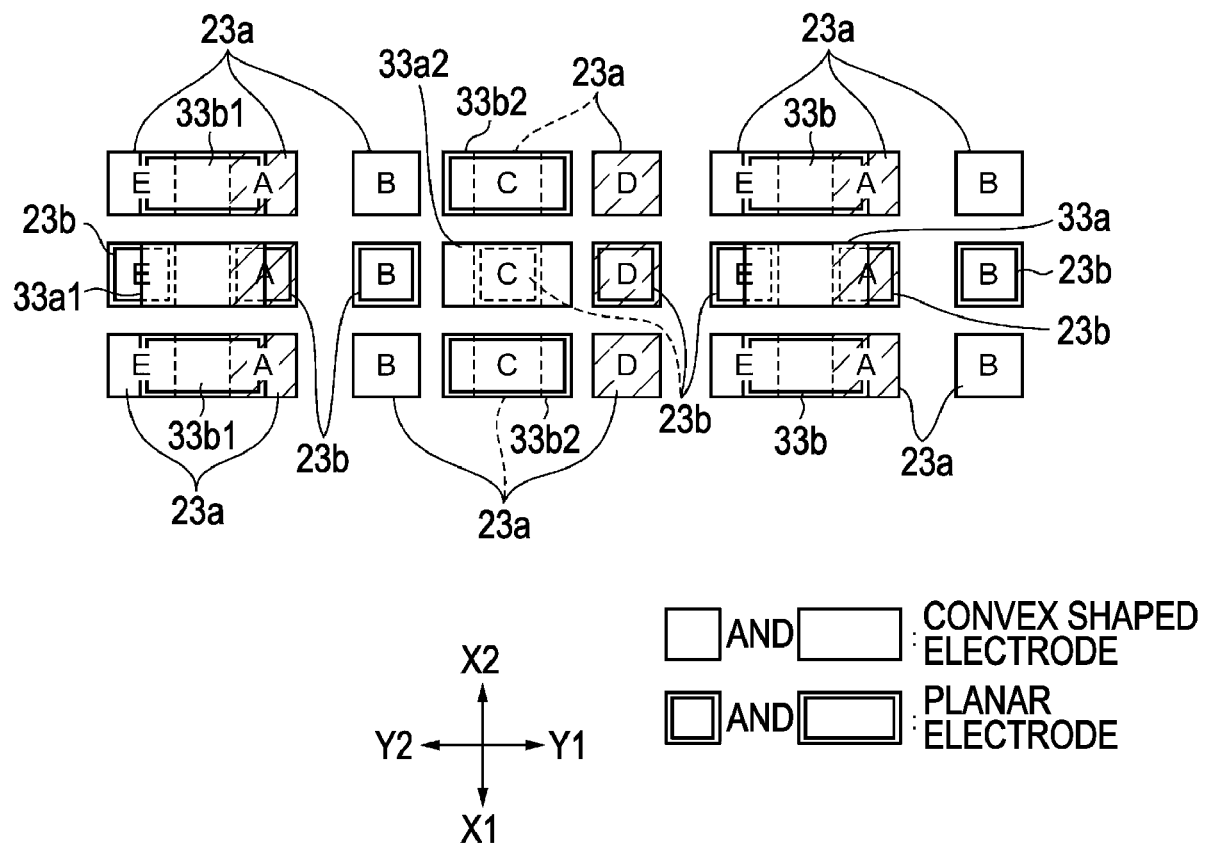
FIG. 5 is a partial plan view illustrating the arrangement of the electrodes when the mover and the stator are assembled.
Figure 6:
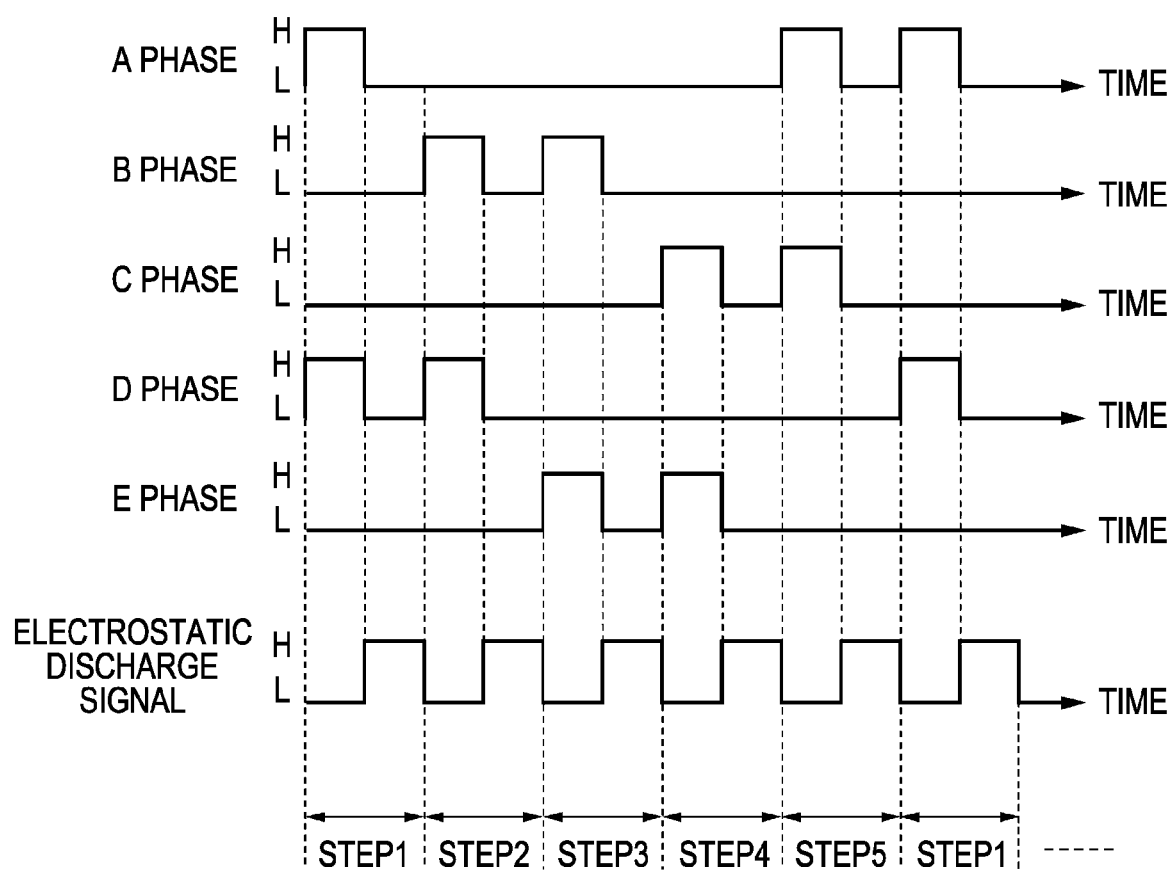
FIG. 6 is a timing diagram illustrating example driving signals applied from the power feeding unit to the phase electrodes of the electrostatic actuator.

FIG. 5 is a partial plan view illustrating the arrangement of the electrodes when the mover and the stator are assembled. FIG. 6 is a timing diagram illustrating example driving signals applied from the power feeding unit to the phase electrodes of the electrostatic actuator. In FIG. 5, the solid line represents a protruding electrode, whereas the double line represents a planar electrode. Reference symbols "A" to "E" represent the states of the protruding stator electrode 23a and the planar stator electrodes 23b (one of the A-phase to the E-phase electrodes). In addition, in FIG. 5, the phase electrodes having a driving signal applied thereto are shown by hatchings (the A-phase electrode and D-phase electrode).

As shown in FIG. 5, predetermined driving signals (e.g., those shown in FIG. 6) are applied to the A-phase electrode to the E-phase electrode composed of the plurality of the protruding stator electrode 23a and the plurality of planar stator electrodes 23b. That is, in STEP 1, the driving signals are applied to the A-phase electrode and the D-phase electrode. In STEP 2, the driving signals are applied to the B-phase electrode and the D-phase electrode. In STEP 3, the driving signals are applied to the B-phase electrode and the E-phase electrode. In STEP 4, the driving signals are applied to the C-phase electrode and the E-phase electrode. In STEP 5, the driving signals are applied to the A-phase electrode and the C-phase electrode.

For example, in an initial state, each a protruding mover electrode 33a1 and a planar mover electrode 33b1 is located between the E-phase electrode and the A-phase electrode while partially facing the E-phase electrode and the A-phase electrode, as shown in FIG. 5. In addition, each of a protruding mover electrode 33a2 and a planar mover electrode 33b2 faces the C-phase electrode.

In such an initial state, if, as shown by STEP 1 shown in FIG. 6, predetermined driving voltages are simultaneously applied to the A-phase electrode and the D-phase electrode, the protruding mover electrode 33a1 and the planar mover electrode 33b1 face the A-phase electrode at a position shifted towards the Y2 side. Accordingly, the protruding mover electrode 33a1 and the planar mover electrode 33b1 are attracted in the Y1 direction by a component of an electrostatic force (a Coulomb force) occurring between themselves and the A-phase electrode in the moving direction. At the same time, the protruding mover electrode 33a2 and the planar mover electrode 33b2 are attracted in the Y1 direction by a component of an electrostatic force occurring between themselves and the D-phase electrode (a Coulomb force) in the moving direction. Consequently, the mover 30 is moved in the Y1 direction by the components of the electrostatic forces occurring between the electrodes.

Such driving signals are repeatedly applied in the order of STEP 1, STEP 2, STEP 3, STEP 4, STEP 5, STEP 1, STEP 2 ..., as shown in FIG. 6. In this way, electrostatic forces are generated between each of the protruding mover electrode 33a1 and the planar mover electrode 33b1 and each of the A- to E-phase electrodes including the protruding stator electrodes 23a and the planar stator electrodes 23b that face the protruding mover electrode 33a1 and the planar mover electrode 33b1 in the order of the steps. Consequently, the mover 30 can be sequentially moved in the Y1 direction.

In contrast, if the order of application of the driving signals is reversed, the mover 30 can be moved in the Y2 direction opposite to the Y1 direction.

In addition, as shown in FIG. 6, if the mover 30 is connected to ground at a time between each of neighboring steps so that electrostatic charges accumulated between each of the protruding stator electrodes 23a and the corresponding one of the planar mover electrodes 33b and between each of the planar stator electrodes 23b and the corresponding one of the protruding mover electrodes 33a are discharged, a large driving force can be reliably generated.

Figure 7:
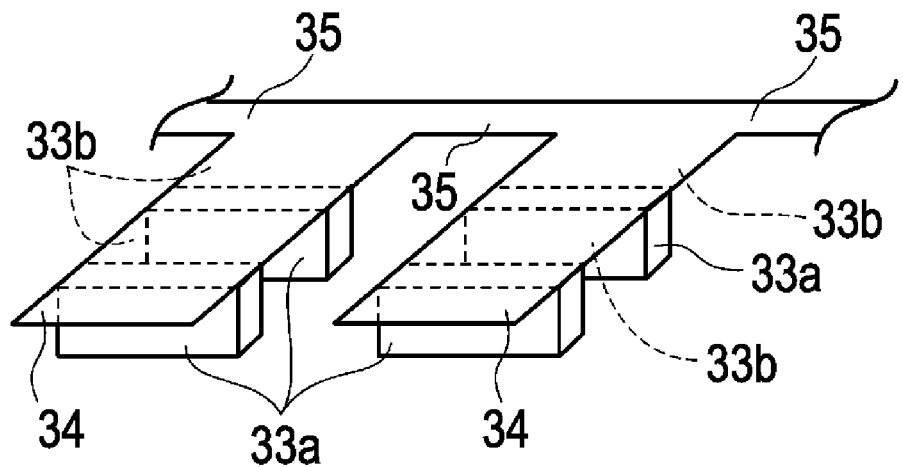
FIG. 7 is a partial perspective view illustrating the arrangement of electrodes of an electrostatic actuator according to a second embodiment of the present invention.
Figure 7:
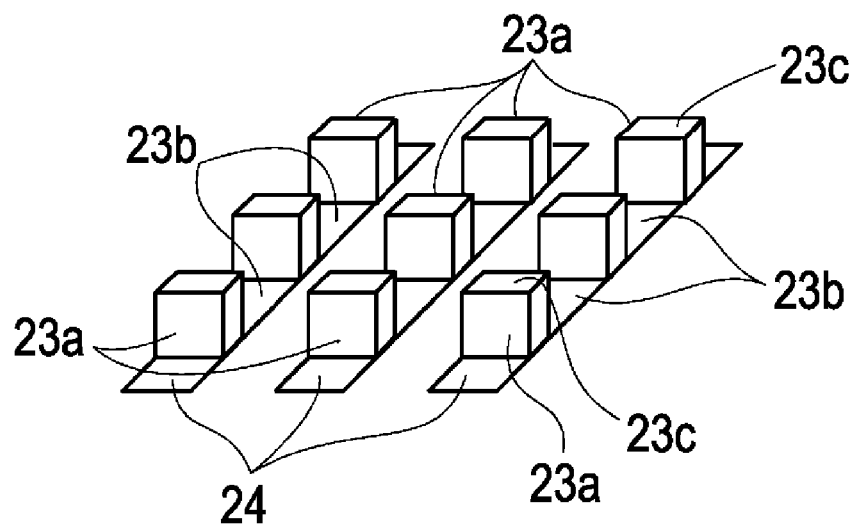
Figure 7:
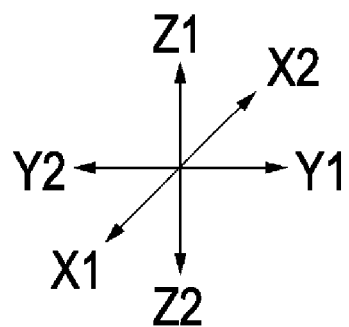

FIG. 7 is a partial perspective view illustrating the arrangement of electrodes of an electrostatic actuator according to a second embodiment of the present invention. Note that, in FIG. 7, a mover and a stator are not shown, and only electrodes are illustrated.

The second embodiment differs from the first embodiment in the following point: although the planar stator electrodes 23b and the planar mover electrodes 33b are disposed independently from the protruding stator electrodes 23a and the protruding mover electrodes 33a in the first embodiment, the planar stator electrodes 23b and the planar mover electrodes 33b are integrally provided in the second embodiment.

That is, in the second embodiment, as shown in FIG. 7, belt-shaped electrodes 24 are formed on the counter surface 20a of the stator 20 so as to linearly extend in the width (X) direction. The protruding stator electrodes 23a are formed so as to protrude from the upper surfaces of the belt-shaped electrodes 24. Thus, the belt-shaped electrodes 24 are exposed to the outside between every pair of protruding stator electrodes 23a arranged in the width direction.

Similarly, belt-shaped electrodes 34 are formed on the counter surface 30a of the mover 30 so as to linearly extend in the width (X) direction. The protruding mover electrodes 33a are formed so as to protrude from the upper surfaces of the belt-shaped electrodes 34. In addition, each of the belt-shaped electrodes 34 is exposed between every protruding mover electrodes 33a arranged in the width direction.

In the mover 30, two neighboring belt-shaped electrodes 34 in the moving (Y) direction are connected to each other using a connection pattern 35 disposed at one end of each of the belt-shaped electrodes 34 in the width (X) direction. Thus, all of the belt-shaped electrodes 34 have the same electrical potential.

Each of the belt-shaped electrodes 24 and 34 is formed by forming an insulating film (e.g., an oxidized film) on the surface of the stator 20 or the mover 30 formed from the silicon base material and pattern-forming a belt-shaped conductive portion (e.g., a chrome or copper portion) on the insulating film. The protruding stator electrodes 23a and the protruding mover electrodes 33a are formed as follows. The surfaces of the conductive portions to be formed into the planar stator electrodes 23b or the planar mover electrodes 33b are covered by a resist layer, and the other portions of the belt-shaped electrodes 24 and 34 are partially exposed. Thereafter, conductive metal layers (e.g., copper layers) are grown on the exposed surfaces of the belt-shaped electrodes 24 and 34 by plating vertically in the Z direction.

In the structure according to the second embodiment, the portions of the belt-shaped electrodes 24 and 34 exposed on the surfaces of the stator 20 and the mover 30 can be used as the planar stator electrodes 23b or the planar mover electrodes 33b. Accordingly, in the same manner as described above, the facing area of the electrodes used for generating electrostatic forces can be increased, and therefore, an electrostatic force (a driving force) generated between each of the phase electrodes and the corresponding mover can be increased. Alternatively, the driving voltage can be lowered or the number of the electrodes can be reduced.

Furthermore, every pair consisting of neighboring protruding stator electrodes 23a and planar stator electrodes 23b in the width direction is directly electrically connected by the belt-shaped electrodes 24. Every pair consisting of neighboring protruding stator electrodes 33a and the planar mover electrodes 33b in the width direction is directly electrically connected by the belt-shaped electrodes 34. Accordingly, the need for formation of the through-holes required for the first embodiment and the operation of disposing the conductor members in the through-holes can be eliminated. As a result, the stator 20 and the mover 30 can be easily manufactured.

According to the second embodiment, an external power feeding unit is connected between the belt-shaped electrodes 24 that form the five types of phase electrodes of the stator 20 and any one of the belt-shaped electrodes 34 of the mover 30. Predetermined driving signals are applied to the phase electrodes. In this way, the mover 30 is moved in the Y direction.

Figure 8:
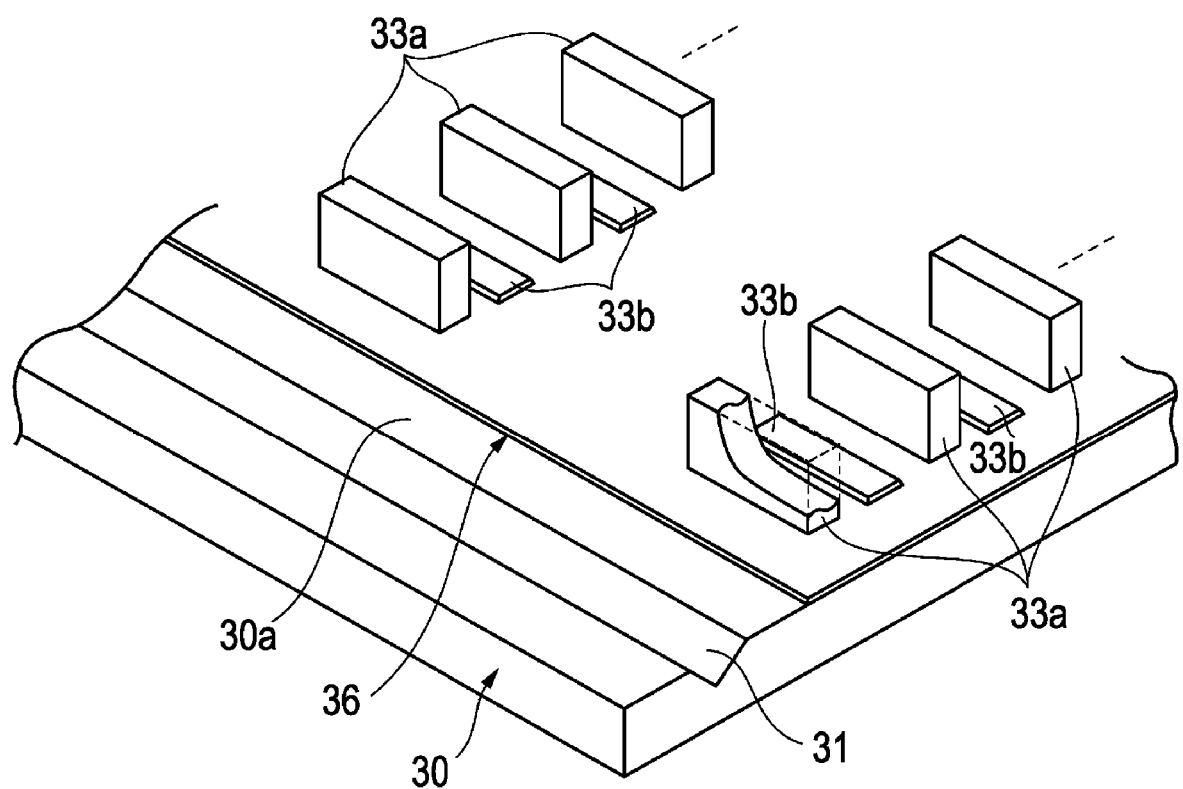
FIG. 8 is a partial perspective view illustrating the structure of a mover of an electrostatic actuator according to a third embodiment of the present invention.
Figure 8:
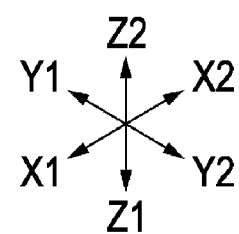

FIG. 8 is a partial perspective view illustrating the structure of a mover of an electrostatic actuator according to a third embodiment of the present invention. In FIG. 8, the mover is shown upside down.

According to the third embodiment, the structure of the mover 30 is different from those of the above-described two embodiments. However, the other structures including that of the stator 20 are similar to those of the first or second embodiment.

As shown in FIG. 8, according to the third embodiment, a conductor plate 36 formed from, for example, a thin copper plate is provided on the counter surface 30a of the mover 30. A plurality of stepped portions are formed on the conductor plate 36 by partially performing a press process. The stepped portions extending in the Z2 direction so as to have a protruding shape serve as planar mover electrodes 33b.

In addition, protruding mover electrodes 33a are formed on the conductor plate 36. The protruding mover electrodes 33a are formed as follows. On the conductor plate 36 including a plurality of the planar mover electrodes 33b, the surfaces of some of the planar mover electrodes 33b and the other surface area of the conductor plate 36 are covered by a resist layer, and the rest of the surfaces of the planar mover electrodes 33b are exposed. Thereafter, conductive metal layers (e.g., copper layers) are grown on the exposed surfaces of the planar mover electrodes 33b by plating vertically in the Z direction.

The planar mover electrodes 33b are formed so as to extend from the conductor plate 36 in the Z2 direction in the drawing. Accordingly, when the stator 20 and the mover 30 are assembled, the distance between one of the planar mover electrodes 33b and the corresponding one of the protruding stator electrodes 23a (the gap size) can be made smaller than the distance between the surface of the conductor plate 36 of the mover 30 and any one of the protruding stator electrodes 23a (the gap size). Therefore, an electrostatic force generated between the former ones (between one of the planar mover electrodes 33b and the corresponding one of the protruding stator electrodes 23a) can be made stronger than that generated between the latter ones (between the surface of the conductor plate 36 of the mover 30 and any one of the protruding stator electrodes 23a). That is, a portion where an electrostatic force is strong and a portion where an electrostatic force is weak appear between the stator and the mover.

According to the third embodiment, an external power feeding unit is connected between the five types of phase electrodes of the stator 20 and the conductor plate 36 of the mover 30. Predetermined driving signals are applied to the mover 30. At that time, by appropriately setting the way of application of the driving signals, the portion where a strong electrostatic force is generated between the stator 20 and the mover 30 can be moved in the moving direction. In this way, the mover 30 can be moved in the moving direction.

In addition, since the facing area between the electrodes that generates a strong electrostatic force can be increased, an electrostatic force (a driving force) generated between each of the phase electrodes and the corresponding mover 30 can be increased. Therefore, the voltage of the power feeding unit can be lowered, or the size of the body of a device can be reduced.

While the foregoing embodiments have been described with reference to a driving method in which the electrostatic actuator is driven using the five phases A to E, the present invention is not limited thereto. For example, three phases or four phases may be employed. Alternatively, phases more than six phases may be employed.

Furthermore, while the foregoing embodiments have been described with reference to the structure in which the stator 20 serves as a plus pole of the applied driving signals whereas the mover 30 serves as a minus pole of the applied driving signals, the present invention is not limited thereto. For example, the mover 30 may serve as a plus pole of the applied driving signals whereas the stator 20 may serve as a minus pole of the applied driving signals.

What is claimed is:

1. An electrostatic actuator comprising:
a stator having a plurality of protruding electrodes formed on a surface of a base material, the surface serving as a counter surface; and
a mover disposed so as to face the stator, the mover having a plurality of protruding electrodes formed on a surface of a base material, the surface serving as a counter surface, a side surface of each of the protruding electrodes of the stator facing a side surface of a corresponding one of the protruding electrodes of the mover;
wherein planar electrodes are formed on at least one of the counter surface of the stator and the counter surface of the mover in a portion other than a portion where the protruding electrodes are formed, and the planar electrodes face end surfaces of the protruding electrodes formed on the other of the counter surface of the stator and the counter surface of the mover.

2. The electrostatic actuator according to claim 1, wherein a plurality of belt-shaped electrodes are formed on at least one of the counter surfaces, each of the plurality of belt-shaped electrodes extends in a width direction perpendicular to a moving direction in which the mover is moved, and the plurality of belt-shaped electrodes are arranged along the moving direction, and wherein the protruding electrodes are formed so as to protrude from the surfaces of the belt-shaped electrodes.

3. The electrostatic actuator according to claim 2, wherein the plurality of belt-shaped electrodes formed on one of the counter surfaces are connected to each other.

4. The electrostatic actuator according to claim 2, wherein each of the plurality of belt-shaped electrodes forms a phase electrode to which a driving signal is applied from a power feeding unit.

5. The electrostatic actuator according to claim 1, wherein at least one of the stator and the mover includes a plurality of through-holes passing through the base material, a conductive portion disposed in each of the through-holes, and a conductor pattern formed on the lower surface of the base material, and wherein one end of the conductive portion is electrically connected to the protruding electrodes and the planar electrodes, and the other end of the conductive portion is electrically connected to the conductor pattern.

6. The electrostatic actuator according to claim 1, wherein a conductor plate is formed on the other counter surface, and the planar electrodes and the protruding electrodes are formed on the conductor plate.

7. The electrostatic actuator according to claim 6, comprising:

planar electrodes formed by raising the surface of the conductor plate into a projection; and protruding electrodes formed by growing a layer on the surface of the planar electrodes by plating.

8. The electrostatic actuator according to claim 1, wherein a plurality of protruding electrodes arranged in the moving direction at predetermined intervals and a plurality of planar electrodes arranged in the moving direction at predetermined intervals are disposed so as to be disposed alternately in the width direction.

9. The electrostatic actuator according to claim 1, wherein the protruding electrodes are in a rectangular parallelepiped shape.

10. The electrostatic actuator according to claim 1, wherein the protruding electrodes are in a shape of a cube.

* * * * *